METHOD AND APPARATUS FOR EXTENDING THE LONG-WAVELENGTH SPECTRAL RESPONSE OF INTRINSIC PHOTOCONDUCTORS

Filed Sept. 9, 1966

INVENTOR

PHILLIP JOHN JOSEPH

BY

AGENT.

United States Patent Office 3,444,500
Patented May 13, 1969

3,444,500
METHOD AND APPARATUS FOR EXTENDING THE LONG-WAVELENGTH SPECTRAL RESPONSE OF INTRINSIC PHOTOCONDUCTORS

Phillip John Joseph, North Tonawanda, N.Y., assignor to Cornell Aeronautical Laboratory, Inc., Buffalo, N.Y., a corporation of New York Filed Sept. 9, 1966, Ser. No. 578,396
Int. Cl. H01c 7/08
U.S. Cl. 338—18 5 Claims

ABSTRACT OF THE DISCLOSURE

An infra-red detector having an intrinsic photoconductor exposed to infra-red radiation and located between two pressure applying anvils to reduce the energy gap of the photoconductor and increase its spectral response.

The present invention relates to a method and apparatus for extending the long-wavelength response or cut off of certain intrinsic photoconductors.

Prior art infra-red detectors utilizing intrinsic photoconductors such as PbS, PbTe and PbSe have been limited in their long-wavelength spectral response to a maximum wavelength of about three microns for PbS and about six microns for PbTe and PbSe with moderate cooling. These limits are due to the relatively large energy gap existing between the valance energy band and the conduction energy band for each of the above mentioned photoconductors. As is known to those skilled in the art, the spectral response is inversely proportional to the energy gap.

Greater long-wavelength spectral responses have been achieved by utilizing certain photoconductors which have been suitably "doped" or modified by the inclusion in the crystal lattice of certain impurities. Germanium "doped" with gold is an example of an extrinsic or "doped" photoconductor. These doped photoconductors when used as infra-red detectors require elaborate cooling structure for proper operation. In addition, they must be relatively large in size in that only the "doped" portions or impurity centers thereof are responsive to the infra-red radiation.

The present invention in addition to overcoming the above disadvantages of the extrinsic or "doped" photoconductors also provides an intrinsic photoconductor that has an infra-red radiation long-wavelength response greater than the prior art limits for such types of intrinsic photoconductors. As is well known, an intrinsic photoconductor is one having a very narrow forbidden energy band separating the valance and conduction energy bands, the photoconductivity of which does not depend on impurity activation or doping.

It has been found that decreasing the lattice spacing of certain semiconductors by compression results in a continuous decrease in the energy gap thereof, whereas certain other types of semiconductors, upon compression experience first an increasing energy gap up to a maximum followed by a decreasing energy gap. The intrinsic photoconductors of the present invention are of the type that experience a continuous decrease in energy gap when under compression; for example, PbS, PbSe and PbTe. And, since, as stated earlier, the spectral response is inversely proportional to the energy gap, compression of the photoconductors such as PbS, PbSc and PbTe will increase their long-wavelength spectral response.

It is accordingly an object of the present invention to provide an apparatus for extending the long-wavelength spectral response of certain intrinsic photoconductors.

Another object of the present invention is the provision of a method of extending the long-wavelength spectral response of certain intrinsic photoconductors.

These and other objects and advantages of the present invention will become apparent from the following detailed description of the same when taken in conjunction with the accompanying drawings therein:

Figure 1:
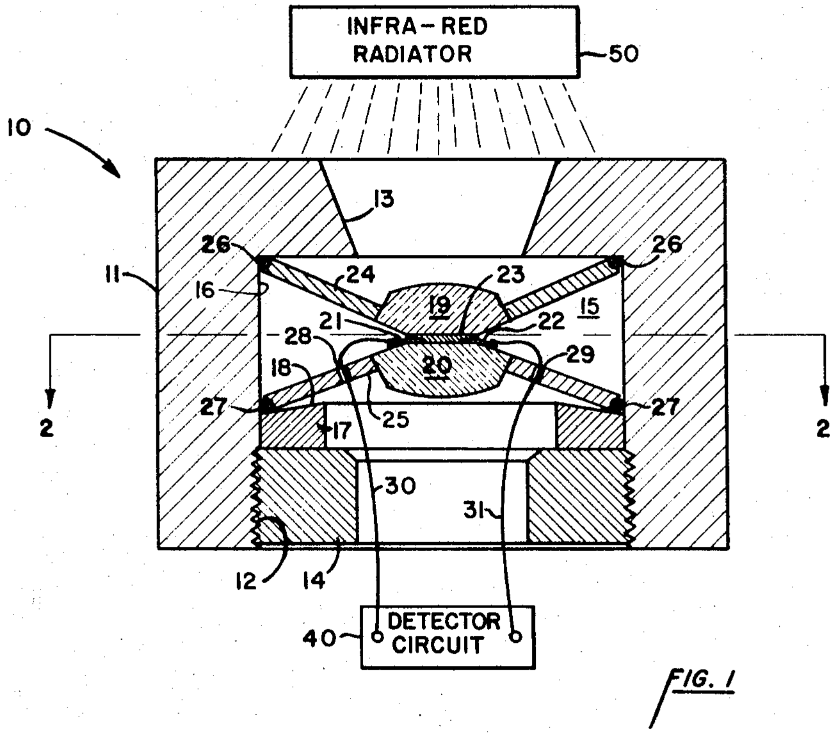
FIGURE 1 is a vertical sectional view of the infra-red detector of the present invention with certain parts thereof greatly enlarged for illustration purposes.
Figure 2:
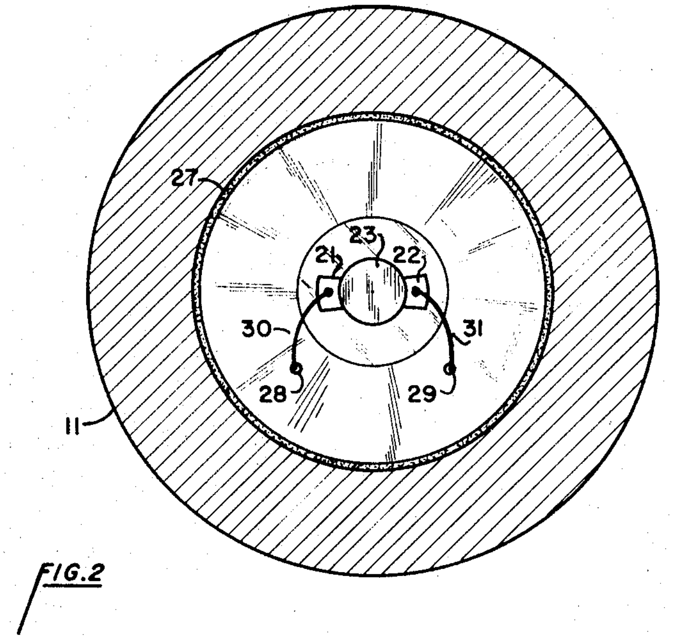
FIGURE 2 is a horizontal sectional view taken along lines 2—2 of FIGURE 1.

Referring now to the drawings, the infra-red detector of the present invention generally indicated at 10 comprises a cylindrical housing 11 having a threaded open lower end 12 and a partially closed upper end defining a conical opening 13. Threadedly mounted in lower end 12 is a ring nut 14, defining with housing 11 an interior chamber 15, having a cylindrical interior side wall 16. Mounted on ring nut 14 and in sliding engagement with interior wall 16 is a bearing washer 17 having an outwardly and downwardly tapering frusto-conical top surface 18.

In chamber 16 are provided a pair of upper and lower anvils 19 and 20, respectively; fabricated of a suitable material of great hardness and strength that is also transparent to infra-red radiation such as sapphire, periclase or diamond, for example. The portions of anvils 19 and 20 that face each other are truncated cones in the manner of the well known Bridgeman Anvils. Suitably bonded to lower anvil 20, as by vacuum deposition, are a pair of metal leads 21 and 22. Also bonded, as for example, by vacuum deposition, to the planar portions of anvil 20 and leads 21 and 22 is a thin layer of photoconductive film 23, such as PbS, PbSe or PbTe. As seen in FIGURE 1, the photoconductor 23 is adapted to be compressed between anvils 19 and 20. It is to be understood that the thickness of photoconductor 23 is greatly enlarged in the drawings for illustration purposes.

Anvil 19 is securely mounted in the conical central opening of an upper Belleville spring washer 24, while anvil 20 is securely mounted in the conical central opening of a lower Belleville spring washer 25. A pair of O-rings 26 and 27 of "Teflon" or the like are respectively mounted in end grooves of the upper and lower Belleville springs 24 and 25. O-ring 26 bears in sliding engagement with the uppermost portion of wall 16, whereas O-ring 27 bears in sliding engagement with a lower portion of wall 16. As can be seen in FIGURE 1, lower O-ring 27 also bears against the tapered top surface 18 of washer 17. Bores 28 and 29 may be drilled in lower spring 25 for the reception of wires 30 and 31 attached to leads 21 and 22, respectively leading to a conventional detector circuit 40.

In operation, ring nut 14 is rotated causing photoconductor 23 to be compressed by the urging together of anvils 19 and 20 which receive the transmitted forces through bearing washer 17 and spring 25. As stated earlier, the compression of photoconductor 23 increases its spectral response to the infra-red radiation emitted from source 50. As is conventional, the infra-red radiation is determined by measuring the changes in conductivity of photoconductor 23 with the detector circuit 40.

It has been determined that an increase in pressure applied to a PbS photoconductor from 0 to 25,000 kg. cm.$^{-2}$ will extend the spectral response thereof from about three to six microns. Moreover, with a PbSe photoconductor under moderate cooling, the same increase in pressure will extend the spectral response from about 4 to about 16 microns.

Thus, the present invention provides a method and apparatus for extending the long-wavelength spectral response of certain intrinsic photoconductors without resorting to special doped semiconductors with their severe cooling requirements.

While a preferred manner and means of carrying out the principles of the present invention has been described, it is intended that the scope thereof is to be limited only by the appended claims.

What is claimed is:

1. A method of extending the long-wavelength spectral response of an intrinsic thin-film photoconductor infrared detector selected from the group consisting of PbS, PbSe and PbTe comprising the steps of;

(1) placing said photoconductor between two pressure responsive means at least one of which is transparent to infra-red radiation, and (2) applying pressure to said pressure responsive means that is substantially greater than atmospheric and of sufficient magnitude to compress said photoconductor such that the energy gap thereof is decreased.

2. The method according to claim 1 further comprising the steps of;

(3) exposing said photoconductor to infra-red radiation while it is subject to said compression.

3. An infra-red detector comprising;

(1) a thin film photoconductor selected from the group consisting of PbS, PbSe and PbTe, (2) means for compressing said photoconductor to a pressure substantially greater than atmospheric and with sufficient force to decrease the energy gap thereof, and (3) means exposing said photoconductor to infra-red radiation while it is subject to said compression.

4. The detector of claim 3 wherein said means for compressing said photoconductor comprises a pair of anvils one of which is transparent to infra-red radiation and each mounted in central openings of a pair of Belleville springs.

5. An infra-red detector comprising;

(1) a cylindrical housing having each end open, (2) a first Belleville spring in said housing bearing against an upper side wall thereof, (3) a second Belleville spring in said housing bearing in sliding engagement against a lower side wall thereof, (4) a first transparent anvil mounted in the central opening of said first Belleville spring and having a planar face, (5) a second transparent anvil mounted in the central opening of said Belleville spring and having a planar face opposite the planar face of said first anvil, (6) a thin film intrinsic photoconductor mounted intermediate the planar faces of said first and second Belleville springs, and, (7) means for applying a force to said second Belleville spring sufficient in magnitude to compress said photoconductor and decrease the energy gap thereof.

References Cited

UNITED STATES PATENTS

| | | | |
|---|---|---|---|
| 1,219,432 | 3/1917 | Brown | 338—19 |
| 3,079,504 | 2/1963 | Hutchens | 338—18 X |

REUBEN EPSTEIN, *Primary Examiner.*